United States Patent [19]

Azuhata et al.

[11] 4,213,944

[45] Jul. 22, 1980

[54] PROCESS FOR REMOVING NITROGEN OXIDES FROM GAS BY AMMONIA

[75] Inventors: Shigeru Azuhata, Hitachi; Hidetoshi Akimoto, Tokaimura; Hideo Kikuchi, Hitachi; Yukio Hishinuma, Hitachi; Ryoichiro Oshima, Hitachi; Yoshijiro Arikawa, Kure, all of Japan

[73] Assignee: Hitachi, Ltd., Japan

[21] Appl. No.: 859,176

[22] Filed: Dec. 9, 1977

[30] Foreign Application Priority Data

Dec. 10, 1976 [JP] Japan .................................. 51-147747

[51] Int. Cl.$^2$ .............................................. B01D 53/00
[52] U.S. Cl. .................................... 423/235; 423/239; 423/351
[58] Field of Search ........................ 423/235, 239, 351

[56] References Cited

U.S. PATENT DOCUMENTS 3,900,554   8/1975   Lyon .................................... 423/235

FOREIGN PATENT DOCUMENTS

| | | |
|---|---|---|
| 2550231 | 5/1976 | Fed. Rep. of Germany . |
| 48-32766 | 5/1973 | Japan .................................... 423/235 |
| 51-20771 | 2/1976 | Japan . |
| 51-94470 | 8/1976 | Japan .................................... 423/239 |
| 1388669 | 3/1975 | United Kingdom . |

*Primary Examiner*—G. O. Peters
*Attorney, Agent, or Firm*—Craig & Antonelli

[57] ABSTRACT

A hot gas containing nitrogen oxides is admixed with ammonia and hydrogen peroxide to reduce the nitrogen oxides to nitrogen and water. Reduction reaction of the nitrogen oxides by ammonia is considerably promoted in a temperature range of 400° to 800° C. by the addition of hydrogen peroxide, and also ammonia present in excess of the nitrogen oxides is decomposed thereby, eliminating an unreacted ammonia effluent.

28 Claims, 4 Drawing Figures

PROCESS FOR REMOVING NITROGEN OXIDES FROM GAS BY AMMONIA

LIST OF PRIOR ART REFERENCE (37 CRF 1.56(a))

The following reference is cited to show the state of art:

U.S. Pat. No. 3,900,554

This invention relates to a process for removing nitrogen oxides, which will be hereinafter referred to as "NO", from a hot gas, such as a combustion flue gas, and more particularly to a process for decomposing $NO_x$ to water, $H_2O$, and nitrogen, $N_2$, in a gaseous phase by reduction, using a reducing agent without any catalyst.

$NO_x$ contained in various combustion flue gases or effluent gases evolving from the nitric acid industry, etc. is harmful materials to the living bodies, and is a cause for photochemical smogs, and thus various processes for removing $NO_x$ have been so far proposed. For example, an adsorption process, an alkali solution absorption process, a reduction process, etc. are typical ones, but the reduction process is much advantageous in simplicity of the required apparatuses and their operation, as compared with said other processes, and is now regarded as a leading one among the so far proposed processes.

The reduction process is classified into two main groups, that is, a non-selective reduction process using hydrocarbons, hydrogen, and carbon monoxide, and a selective reduction process using ammonia. In the former non-selective reduction process, oxygen existing in a large amount in the flue gas is reduced at the same time as the reduction of $NO_x$, and thus a larger amount of a reducing agent is consumed. On the other hand, in the latter selective reduction process, $NO_x$ is selectively reduced in preferance to $O_2$, and a smaller amount of a reducing agent is consumed than in the former non-selective reduction process. That is, the latter selective reduction process has a better economy. Thus, the selective reduction process is now regarded as particularly more important than the non-selective reduction process.

The reduction reaction of $NO_x$ by ammonia proceeds at a temperature of 300° to 500° C. in the presence of a metallic oxide catalyst. It is disclosed in U.S. Pat. No. 3,900,554 to R. K. Lyon that the reduction reaction proceeds at such a high temperature as 704° to 1092° C. (1,300° F. to 2,000° F.) without using any catalyst.

The process using no catalyst is very simple in the required apparatuses and technology, because there are no special problems ascribable to the catalytic process such as a step for coping with dusts accumulated on the surface of the catalyst, or a necessity for special reactors.

An ammonia reduction process using no catalyst requires a higher reaction temperature, and has many problems when applied to the existing combustors, for example, boilers and gas turbines. That is, there are problems ascribable to higher reaction temperature conditions, for example, how to uniformly mix ammonia with a hot combustion gas, how to maintain the gas in a hot state for the necessary period of time for the reaction of $NO_x$ with ammonia.

An object of the present invention is to provide a process for lowering the reaction temperature for the reduction of $NO_x$ in a flue gas by ammonia using no catalyst.

Another object of the present invention is to provide a process for decomposing excess ammonia added for the reduction of $NO_x$, eliminating an unreacted ammonia effluent from the treated flue gas.

Other object of the present invention is to provide a process for effectively conducting reduction of $NO_x$ by ammonia.

Still other object of the present invention is to provide a concrete mode of applying the present invention to the existing combustors such as boilers and gas turbines.

According to the present invention, ammonia is used as a reducing agent to remove $NO_x$ from a hot gas, and further hydrogen peroxide ($H_2O_2$) is injected to the gas to increase the activity of ammonia or decompose the unreacted ammonia.

Mechanism of homogeneous gas phase reduction of $NO_x$ by ammonia is presumed to take place as follows:

At first, H of $NH_3$ is taken out of $NH_3$ by $O_2$ and $NH_3$ is converted to amino radical ($.NH_2$) according to the following equation (1).

$$NH_3 + O_2 \rightarrow .NH_2 + HO_2 \tag{1}$$

Then, the amino radical reacts with NO to convert NO to $N_2$ according to the following equation (2).

$$.NH_2 + NO \rightarrow N_2 + H_2O \tag{2}$$

Reaction rate of equation is so high that the reaction proceeds even at room temperature.

The conventional ammonia reduction process requires a high temperature of at least 700° C., preferably 850° C. or higher, because the reaction of equation (1) needs such a high temperature.

As a result of studies of a process for conducting the reaction of equation (1) at a lower temperature, the present inventors have found that the formation of amino radical is effectively carried out by hydrogen peroxide.

Hydrogen peroxide is decomposed at a temperature of 400° C. or higher to form a hydroxyl radical (.OH). H of $NH_3$ is presumed to be taken out of $NH_3$ by said hydroxyl radical to form an amino radical according to the following equation (3).

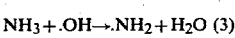
$$NH_3 + .OH \rightarrow .NH_2 + H_2O \tag{3}$$

The reaction of $NH_3$ with the hydroxyl radical proceeds faster and even at a lower temperature than the reaction of $NH_3$ with $O_2$. Temperature of reduction of NO by $NH_3$ and $H_2O_2$ depends upon the temperature of decomposition of $H_2O_2$ to the hydroxyl radical.

The amino radical itself is very unstable, and can preferentially react with $NO_x$, if $NO_x$ exists. However, when there is no $NO_x$ but much $O_2$, the amino radical reacts with $O_2$ to form $NO_x$. On the other hand, when there is less $O_2$, the amino radical is further decomposed to nitrogen and hydrogen.

The reducing agent to be used in the present invention includes ammonia, ammonium salts, amines, and amides, but ammonia is industrially effective because of its low cost.

The present invention will be described in detail below:

An amount of ammonia necessary for effective decomposition of $NO_x$ in a flue gas by reduction is given about 0.3 to about 10 by a molar ratio of ammonia to $NO_x$ ($NH_3/NO_x$), and preferably about 0.5 to about 3 when the economy and prevention of discharge of unreacted ammonia as an effluent are taken into account.

Hydrogen peroxide is injected into the flue gas in an amount satisfactory for the decomposition of ammonia, and can be given about 0.03 to about 3 by a molar ratio of ammonia to hydrogen peroxide ($H_2O_2/NH_3$). Hydrogen peroxide is decomposed immediately at a temperature above 400° C., and there is thus no fear of discharging the unreacted hydrogen peroxide as an effluent almost at all, but a ratio of $H_2O_2/NH_3$ of about 0.05 to about 2 is preferable from the economical viewpoint.

In the present invention, ammonia decomposed by hydrogen peroxide is made to react with $NO_x$, and thus differently from the conventional ammonia reduction process it is not necessary that oxygen is contained in the flue gas. When the large amount of oxygen exists, amino radicals react with oxygen to yield $NO_x$ and percent $NO_x$ removal is decreased. The same thing can be said in the conventional process. An oxygen concentration for the present invention is 0 to 20%. Preferable oxygen concentration is not more than 10%.

When $NO_x$ in a large volume of a combustion flue gas, for example, from boilers and gas turbines for power station is removed by reduction, it is necessary that ammonia as the reducing agent and hydrogen peroxide activating the ammonia be uniformly mixed into the combustion flue gas. At least 0.1 second is necessary for the uniform mixing, and thus the reagents added must be kept in a reactable state without any decomposition, etc. of the reagents at least for said time necessary for the mixing. Hydrogen peroxide is very unstable and decomposable at 400° C. or higher, and some technique is required for the addition of the reagents.

According to a preferable mode of adding hydrogen peroxide, hydrogen peroxide is diluted with a large volume of nitrogen gas or air, and introduced into a combustion flue gas to be treated. According to another mode, hydrogen peroxide is diluted with water to make an aqueous 0.1–3% solution, and the resulting aqueous solution is sprayed into a combustion flue gas by means of another gas under a pressure of 2 to 10 kg/cm².

The gas containing $NO_x$ having a temperature of 400° to 1,200° C. is applicable to the present invention. The percent $NO_x$ removal is lowered at lower than 400° C., and the amount of $NO_x$ is increased by the oxidation of added ammonia at higher than 1,200° C.

When the combustion flue gas contains a sufficient amount of oxygen, ammonia rapidly reacts with oxygen in a temperature region above 800° C., and thus the effect of adding hydrogen peroxide will not be observed. When the amount of oxygen is short, even though the temperature is higher than 800° C., the effect of adding hydrogen peroxide is remarkable. Even though there is a sufficient amount of oxygen, the reaction of ammonia with oxygen proceeds very slowly in a temperature region of 400° to 800° C., and thus the effect of adding hydrogen peroxide is remarkable in this case.

According to an economical mode of adding hydrogen peroxide to a gas containing $NO_x$ and oxygen, ammonia is added at first to the gas in a region of a gas temperature of higher than 800° C., and then hydrogen peroxide to the gas in a region of a gas temperature of not higher than 800° C. Of course, ammonia and hydrogen peroxide can be added to the gas at the same time.

Hydrogen peroxide also has an action to oxidize NO to $NO_2$ besides the action to decompose ammonia to form a reaction intermediate (amino radical, $.NH_2$) capable of reducing NO. Since much ammonia is required for the reduction of $NO_2$ down to $N_2$, the formation of $NO_2$ inhibits the $NO_x$ removal reaction.

It is preferable to add hydrogen peroxide to the gas portions by portions from a plurality of nozzles to the addition from a single nozzle, since the addition from a plurality of nozzles can reduce the formation of $NO_2$ and consequently enhance the percent $NO_x$ removal.

When the present invention is applied to a combustion flue gas from a heavy oil-fired boiler for power station, ammonia is added to the gas at a secondary superheater zone having a gas temperature of 800° to 1000° C. and then hydrogen peroxide to the gas at the inlet or outlet of reheater having a gas temperature of 600° to 800° C. This mode ensures a higher percent $NO_x$ removal, and a higher economy of hydrogen peroxide.

Now, the present invention will be described, referring to Examples by way of the accompanying drawings.

EXAMPLE 1

A quartz glass tube reactor (diameter: 15 mm, length: 1,200 mm) was heated to a predetermined temperature by an electric resistance oven. A mixed gas consisting of NO, $O_2$, $N_2$, and $NH_3$ was introduced into the heated tube reactor. Concentration of each component in the mixed gas was adjusted by a flow rate meter. An injection inlet was provided at a position along the tube reactor, and $H_2O_2$ was injected by spraying through the injection inlet by means of $N_2$ gas, and mixed into the mixed gas. $NO_x$ concentration of the reaction product gas was measured by sampling a small amount of the effluent gas at the outlet of the tube reactor, and leading the sampled gas to a chemiluminescence $NO_x$ analyser.

Figure 1:
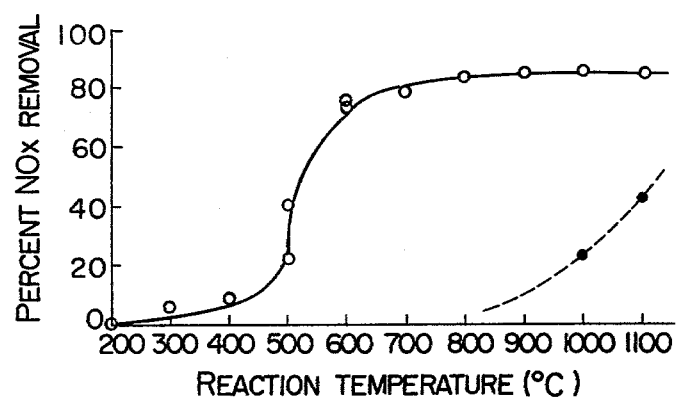
FIGS. 1 and 2 show effects of reaction temperature upon percent $NO_x$ removal, where dotted line shows the conventional example using no hydrogen peroxide.

Test results when 500 ppm of $H_2O_2$ was injected into a mixed gas having an initial NO concentration of 200 ppm, zero concentration of $O_2$ and 500 ppm of $NH_3$ are shown in FIG. 1 by a full line, where percent $NO_x$ removal is indicated on the ordinate, and reaction temperature on the abscissa. Percent $NO_x$ removal is calculated according to the following formula:

$$\text{Percent } NO_x \text{ removal} = \frac{(\text{initial NO concentration}) - (\text{NO concentration after addition of } H_2O_2 \text{ and } NH_3)}{(\text{initial NO concentration})} \times 100 \, (\%)$$

Relations between the percent $NO_x$ removal and reaction temperature when $NO_x$ removal was carried out only by ammonia without injecting hydrogen peroxide are likewise shown in FIG. 1 by a dotted line. When there is no oxygen, the effective $NO_x$ removal cannot be attained unless the gas is heated at least to 1,000° C. On the other hand, in the present invention a high percent $NO_x$ removal can be obtained at about 500° C. and higher by adding hydrogen peroxide to the gas, as is evident from FIG. 1.

EXAMPLE 2

Figure 2:
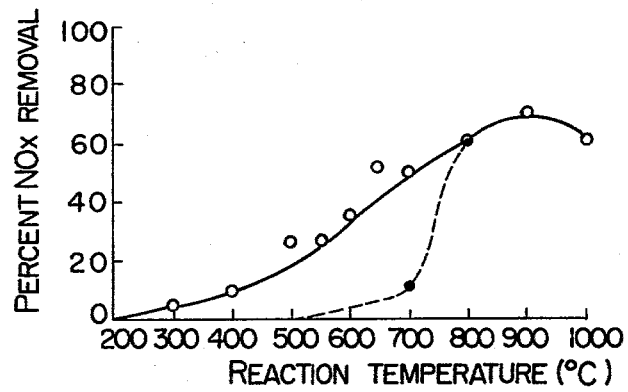

$NO_x$ removal was carried out in the same apparatus under the same test conditions as in Example 1, except that the $O_2$ concentration was changed to 15% from zero %. Test results are shown in FIG. 2 by a full line. As is evident from FIG. 2, a high $NO_x$ removal can be obtained at about 500° C. and higher even at a high oxygen concentration of 15% in the present invention. Percent $NO_x$ removal by $NH_3$ without adding $H_2O_2$ to the gas is shown in FIG. 2 by a dotted line. The effect of adding $H_2O_2$ according to the present invention is more evident from comparison of the full line with the dotted line.

EXAMPLE 3

Tests to determine ratios of hydrogen peroxide to be added were conducted in an apparatus similar to that of Example 1. Tube reactor was made from Pyrex glass (diameter: 40 mm), and reaction temperature and reaction time were set to 700° C. and 3.6 seconds, respectively. Initial NO concentration was set to 100 ppm; initial $NH_3$ concentration 500 ppm; $O_2$ concentration 0, 2 and 15%; and added hydrogen peroxide concentration 0-500 ppm.

Figure 3:
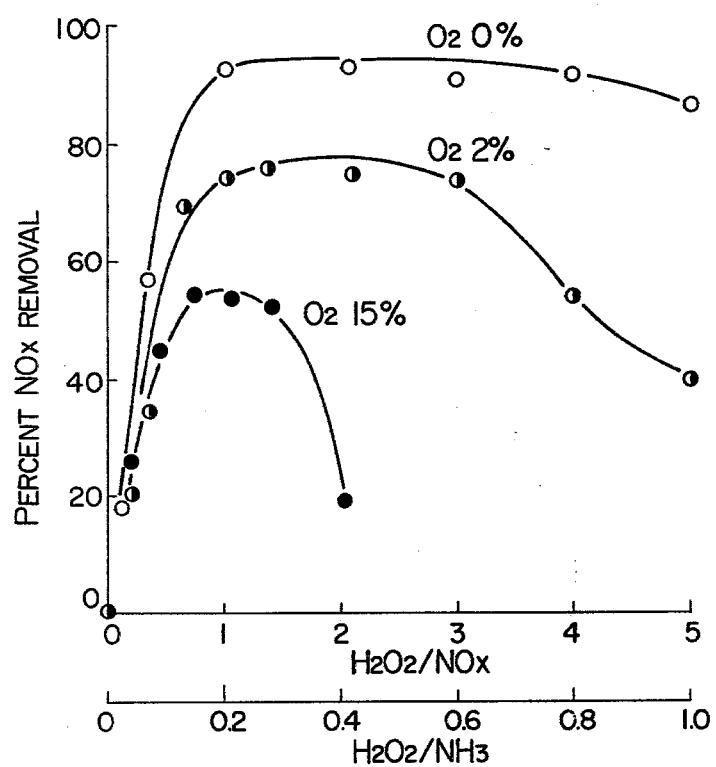
FIG. 3 shows effects of molar ratios of hydrogen peroxide to $NO_x$, and hydrogen peroxide to ammonia upon percent $NO_x$ removal.

Relations between percent $NO_x$ removal and ratios of hydrogen peroxide added are shown in FIG. 3.

Optimum ratio of hydrogen peroxide depends upon the concentration of existing oxygen. So long as the oxygen concentration is not more than 2%, a sufficient molar ratio of hydrogen peroxide to ammonia is 0.03 to 3.

EXAMPLE 4

An example of providing a plurality of hydrogen peroxide injection nozzles is shown. A pyrex glass tube reactor (diameter: 40 mm, length 120 mm) was heated to a predetermined temperature by an electric oven. A mixed gas consisting of NO, $NH_3$, $O_2$ and $N_2$, each gas component of which was adjusted by a graded gas flow meter, was led to the heated tube reactor. Hydrogen peroxide was added to the mixed gas from two nozzles provided at a distance of 30 cm from each other. Hydrogen peroxide is a liquid under the conditions of normal temperature and normal pressure, and thus is at first made into small droplets by a sprayer, then heated to about 150° C., thereby vaporizing the droplets, and injected into the mixed gas.

Test results when a total gas flow rate was set to 0.36 $Nm^3/hr$, and an initial NO concentration 100 ppm are shown in Table 1.

EXAMPLE 5

An example of applying the present invention to an actual small scale boiler is shown.

Figure 4:
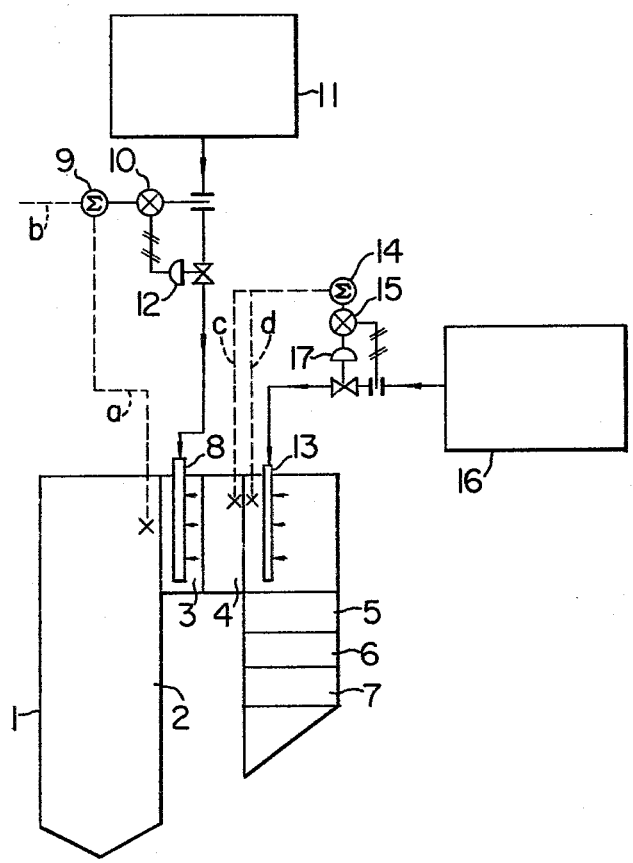
FIG. 4 is a schematic flowdiagram of an apparatus for removing $NO_x$ from a combustion flue gas from a boiler according to the present invention.

FIG. 4 shows a schematic arrangement of a boiler and devices for injecting ammonia and hydrogen peroxide according to the present invention. A boiler 1 consists of a furnace 2, a secondary superheater 3, a high temperature reheater 4, a primary superheater 5, a low temperature reheater 6, and an economizer 7, and a combustion flue gas flows in this order. Temperature of the combustion flue gas is lowered in the same order as above, through heat exchange with steam. Gas temperatures and an example of composition of combustion flue gas are given below:

Gas temperatures are 1,100° C. at the outlet of the furnace 2, 850° C. at the outlet of the secondary superheater 3, 800° C. at the outlet of the high temperature reheater 4, and 450° C. at the outlet of the primary superheater 5. Composition of a combustion flue gas to be treated is 2% $O_2$, 150 ppm NO, 10% $H_2O$, and 11% $CO_2$, the balance being $N_2$. Gas temperature depends upon a boiler, and there is a temperature fluctuation of 600° C. to 800° C. at the outlet of the high temperature reheater 4.

A $NH_3$ injection nozzle 8 is provided at the secondary superheater 3. Signal a of $NO_x$ concentration of the combustion flue gas and signal b of boiler load enter into an adder 9, and a flow rate of $NH_3$ from a $NH_3$ storage tank 11 is controlled by a signal from a $NH_3$ injection rate predeterminer 10 through a control valve 12.

Then, a hydrogen peroxide ($H_2O_2$) injection nozzle 13 is provided at the outlet of the high temperature reheater 4. A $NH_3$ concentration c and an $NO_x$ concentration d are detected near the nozzle 13, and a $H_2O_2$ flow rate from a $H_2O_2$ storage tank 16 is controlled by signals from an adder 14 and a $H_2O_2$ injection rate determiner 15 through a control valve 17.

Test results are given in Table 2.

Table 2

| Run No. | Concentration of $NH_3$ injected | Concentration of $H_2O_2$ injected | Concentration of $NO_x$ at outlet of economizer | Concentration of $NH_3$ at outlet of economizer |
|---|---|---|---|---|
| 1 | 150 ppm | 0 ppm | 105 ppm | 80 ppm |
| 2 | 150 ppm | 20 ppm | 80 ppm | 40 ppm |
| 3 | 150 ppm | 50 ppm | 70 ppm | 5 ppm |
| 4 | 150 ppm | 100 ppm | 55 ppm | 1 ppm |
| 5 | 300 ppm | 0 ppm | 100 ppm | 150 ppm |
| 6 | 300 ppm | 70 ppm | 50 ppm | 50 ppm |
| 7 | 500 ppm | 0 ppm | 100 ppm | 300 ppm |
| 8 | 500 ppm | 150 ppm | 10 ppm | 5 ppm |

Table 1

| Run no. | Reaction temperature | Oxygen concentration | Concentration of $H_2O_2$ added at first inlet | Concentration of $H_2O_2$ added at second inlet | $NH_3$ concentration | $NO_x$ concentration at outlet |
|---|---|---|---|---|---|---|
| 1 | 550° C. | 15% | 60 ppm | 0 ppm | 500 ppm | 56 ppm |
| 2 | 550° C. | 15% | 50 ppm | 10 ppm | 500 ppm | 44 ppm |
| 3 | 650° C. | 2% | 50 ppm | 0 ppm | 300 ppm | 32 ppm |
| 4 | 650° C. | 2% | 30 ppm | 20 ppm | 300 ppm | 24 ppm |

Run Nos. 2 and 4 are cases of $H_2O_2$ injection from the first and second nozzles, where $NO_x$ concentration at the outlet of the tube reactor is lower than that of Run Nos. 1 and 3.

It is seen from the foregoing results that $NO_x$ and $NH_3$ discharged as effluents can be controlled by adding $H_2O_2$ to the combustion flue gas.

What is claimed is:

1. A process for removing nitrogen oxides from a gas containing nitrogen oxides, which comprises adding a reducing agent selected from the group consisting of ammonia, ammonium salts, amines and amides and hydrogen peroxide to the gas, the gas having a temperature of 400°–1200° C., thereby decomposing the nitrogen oxides to a nitrogen gas and water.

2. A process according to claim 3, wherein the reducing agent and the hydrogen peroxide are uniformly mixed into the gas.

3. A process according to claim 1, wherein said gas contains 0 to 20% oxygen.

4. A process according to claim 3, wherein said gas contains no oxygen.

5. A process according to claim 3, wherein the hydrogen peroxide is diluted with either air or nitrogen and then added to the gas.

6. A process for removing nitrogen oxides from a gas containing nitrogen oxides, which comprises adding ammonia and hydrogen peroxide to the gas at a gas temperature of 400° to 1,200° C., thereby decomposing the nitrogen oxides to a nitrogen gas and water.

7. A process according to claim 1, wherein the ammonia is added to the gas at a molar ratio of ammonia to nitrogen oxides of 0.3–10:1, and the hydrogen peroxide at a molar ratio of hydrogen peroxide to ammonia of 0.03–3:1.

8. A process according to claim 1, wherein the ammonia is added to the gas in a temperature region of at least 800° C., and then the hydrogen peroxide in a region of 400° to 800° C.

9. A process according to claim 1, wherein the hydrogen peroxide is added to the gas in a form of an aqueous 0.1–3% solution.

10. A process according to claim 6, wherein said gas contains 0 to 20% oxygen.

11. A process according to claim 10, wherein the hydrogen peroxide is diluted with either air or nitrogen and then added to the gas.

12. A process according to claim 9, wherein said solution is added to the gas as a spray.

13. A process according to claim 10, wherein the hydrogen peroxide is added to the gas through a plurality of inlets, whereby formation of $NO_2$ by oxidation of NO by hydrogen peroxide is reduced and percent nitrogen oxide removal is enhanced.

14. A process for removing nitrogen oxides from a gas containing nitrogen oxides, which comprises adding ammonia to the gas at a molar ratio of ammonia to nitrogen oxides of 0.3–10:1, and hydrogen peroxide to the gas at a molar ratio of hydrogen peroxide to ammonia of 0.03–3:1 in a temperature region of 400° to 800° C., thereby reducing the nitrogen oxides to a nitrogen gas and water.

15. A process according to claim 14, wherein the hydrogen peroxide is added to the gas in a form of an aqueous 0.1–3% solution.

16. A process according to claim 14, wherein said gas contains 0 to 20% oxygen.

17. A process according to claim 15, wherein said solution is added to the gas as a spray.

18. A process according to claim 16, wherein said gas also contains oxygen and said ammonia is added to said gas in a temperature region of higher than 800° C. prior to the adding of hydrogen peroxide to the gas.

19. A process according to claim 16, wherein the hydrogen peroxide is diluted with either air or nitrogen and then added to the gas.

20. A process for removing nitrogen oxides from a boiler combustion flue gas containing nitrogen oxides, wherein the flue gas passes, successively, through a furnace, a secondary superheater, a high temperature reheater, and a primary superheater, and wherein ammonia is added to the gas in the secondary superheater, and hydrogen peroxide is added to the gas at a downstream of the high temperature reheater, both of the ammonia and the hydrogen peroxide being added to the gas at a gas temperature of 400° to 1200° C., thereby reducing the nitrogen oxides to a nitrogen gas and water.

21. A process according to claim 20, wherein said boiler combustion flue gas contains 0 to 20% oxygen.

22. A process according to claim 21, wherein the ammonia and the hydrogen peroxide are uniformly mixed into the flue gas.

23. A process for removing nitrogen oxides from a gas containing nitrogen oxides, which comprises adding ammonia and hydrogen peroxide to the gas at a gas temperature of 400° to 1,200° C., thereby decomposing the nitrogen oxides to a nitrogen gas and water, whereby said decomposing is carried out without using a catalyst.

24. A process according to claim 23, wherein said gas contains 0 to 20% oxygen.

25. A process according to claim 22, wherein said gas contains not more than 10% oxygen.

26. A process for removing nitrogen oxides from a gas containing nitrogen oxides, which comprises adding a reducing agent selected from the group consisting of ammonia, ammonium salts, amines and amides and hydrogen peroxide to the gas, the gas containing 0 to 20% oxygen, the gas having a temperature of 400°–1200° C., thereby decomposing the nitrogen oxides to a nitrogen gas and water, said decomposing being carried out without using a catalyst.

27. A process for removing nitrogen oxides from a gas containing nitrogen oxides, which comprises adding ammonia to the gas at a molar ratio of ammonia to nitrogen oxides of 0.3–10:1, and hydrogen peroxide to the gas at a molar ratio of hydrogen peroxide to ammonia of 0.03–3:1, in a temperature region of 400° to 800° C., said gas containing 0 to 20% oxygen, thereby reducing the nitrogen oxides to a nitrogen gas and water, the reducing of the nitrogen oxides to a nitrogen gas and water being carried out without using a catalyst.

28. A process for removing nitrogen oxides from a boiler combustion flue gas containing nitrogen oxides, wherein the flue gas passes, successively, through a furnace, a secondary superheater, a high temperature reheater, and a primary superheater, and wherein ammonia is added to the gas in the secondary superheater, and hydrogen peroxide is added to the gas at a downstream of the high temperature reheater, both of the ammonia and the hydrogen peroxide being added to the gas at a gas temperature of 400° to 1200° C., the boiler combustion flue gas containing 0 to 20% oxygen, thereby reducing the nitrogen oxides to a nitrogen gas and water, the reducing of the nitrogen oxides to a nitrogen gas and water being carried out without using a catalyst.

* * * * *